Nov. 18, 1941.     F. SLEZAK     2,263,054
THERMOSTAT ADJUSTING DEVICE
Filed Aug. 3, 1938     2 Sheets-Sheet 1
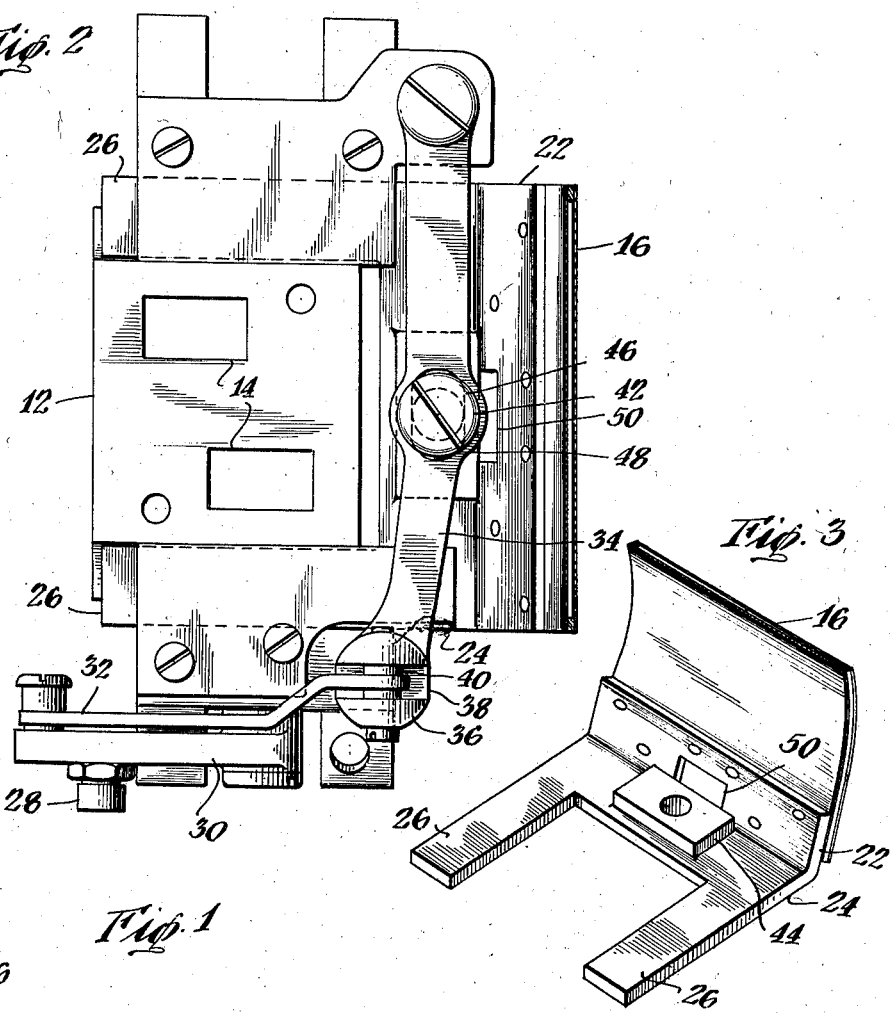
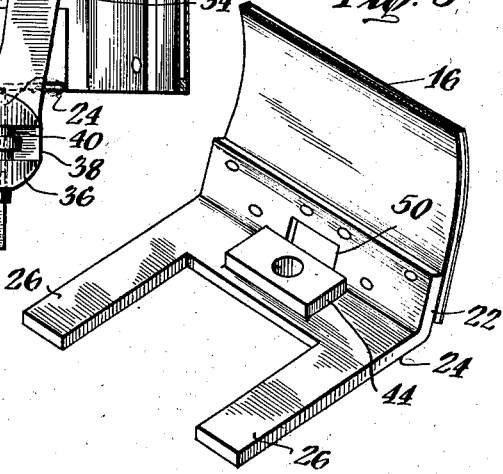
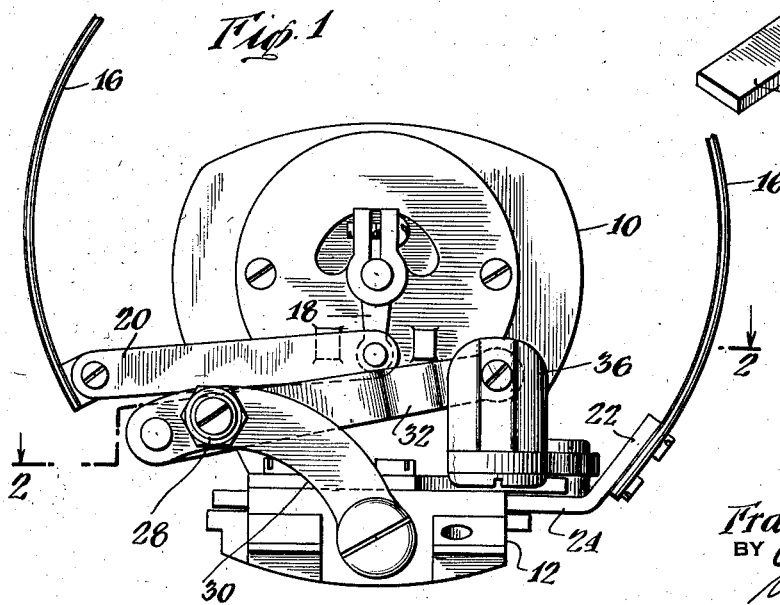
INVENTOR
Frank Slezak
BY
ATTORNEYS

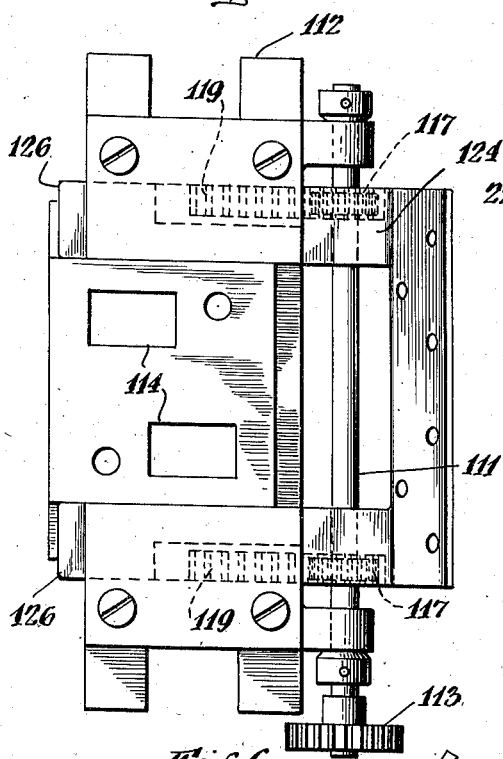
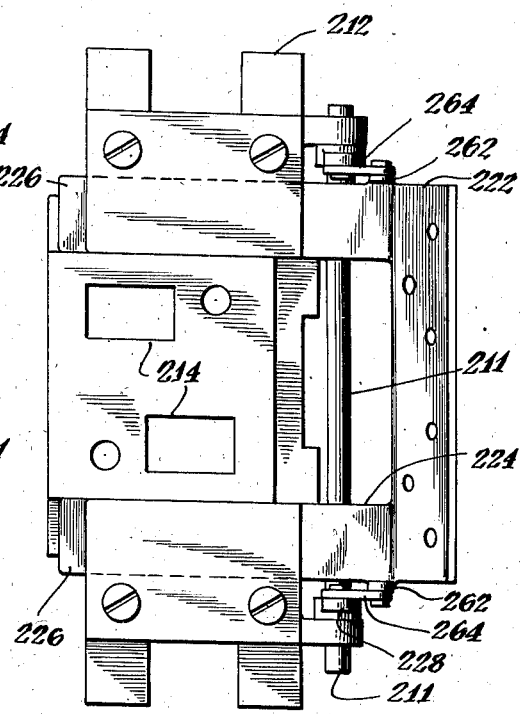
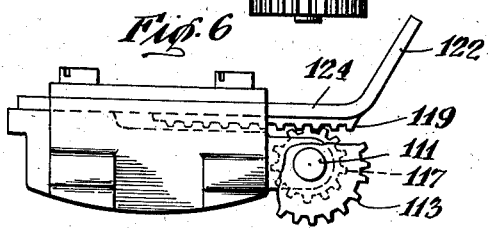
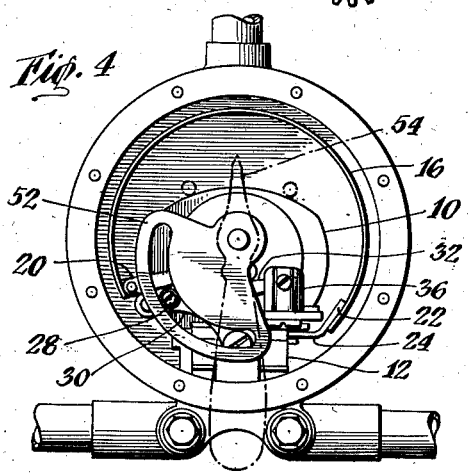
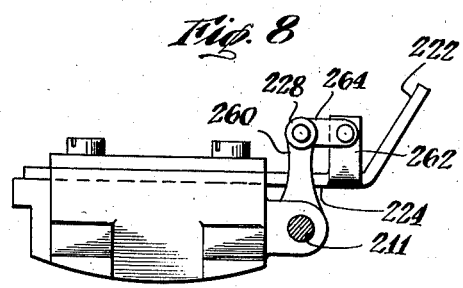

Patented Nov. 18, 1941

2,263,054

UNITED STATES PATENT OFFICE 2,263,054

THERMOSTAT ADJUSTING DEVICE

Frank Slezak, Maspeth, Long Island, N. Y., assignor to Thermo-Mix, Inc., a corporation of New York Application August 3, 1938, Serial No. 222,895

14 Claims. (Cl. 236—101)

This invention relates to a thermostat adjusting device, and more particularly to such a device as applied to a thermostatic element serving as a controlling element.

An object of this invention is to provide a simple positive arrangement for adjusting one end of a thermostatic element.

Another object of my invention is to increase the range of control of the usual thermostatic element.

A further object of my invention is to provide an arrangement for adjusting one end of a thermostatic element in such a manner as to increase its range of operable control, as compared with the adjusting means now used in the art.

Further objects and advantages of my invention will be obvious from a study of the attached specification and drawings wherein:

Fig. 1 is a front view of one form of my invention as used in connection with a thermostatically controlled valve;

Fig. 2 is a top view, partially in cross section of the construction shown in Fig. 1, the valve having been removed;

Fig. 3 is a detailed view of the thermostat carrying element provided in Figs. 1 and 2;

Fig. 4 is a front view of my construction as applied to a thermostatically controlled mixing valve, the front of the casing and the handle being removed to expose the interior construction;

Fig. 5 is a top view of a modified form of adjusting means;

Fig. 6 is a front view of the construction illustrated in Fig. 5;

Fig. 7 is a top view of a third form of adjusting means; and,

Fig. 8 is a front view of the modification illustrated in Fig. 7.

As illustrated in Figs. 1 to 4 inclusive, my improved thermostatic element adjusting device is admirably though not necessarily adapted for use with a valve designated as 10 which may be, for example, of the type disclosed in my co-pending application Serial No. 180,923 filed December 21, 1937, now U. S. Patent No. 2,235,651, issued March 18, 1941, or of the type disclosed in United States patent to Becker No. 1,787,304 issued December 30, 1930. The mixing valve indicated at 10 is usually provided with a base portion 12 in which are formed openings 14 communicating on the one hand with the interior of the valve proper and on the other hand with the conduits leading thereto. A temperature regulated valve such as the mixing valve 10 is usually controlled by a thermostatic element responsive to the temperature of the fluid to be mixed. This thermostatic element has been indicated by the reference numeral 16 and shown as a bi-metallic element. One end of the thermostatic element 16 may be connected to control the valve proper through an arm 18 rotatably mounted to actuate this valve, and pivotally interconnected with one end of the thermostatic element 16 by means such as a link 20. The other end of the thermostatic element 16 is adjustably attached to the valve 10, in this case, to its base 12, by attachment to an upstanding edge 22 of a member 24 slidably positioned in the base member 12. In the preferred form of my construction the member 24 is formed somewhat in the shape of a U having legs 26 which slidably fit into suitable openings in the base member 12 of the valve 10. For adjusting the position of the member 24 and thus the adjustable end of the thermostat 16, in the preferred embodiment of my construction shown in Figs. 1 to 4 inclusive, a roller wheel 28 rotatably mounted on a crank 30 may be provided. The crank 30 is pivotally mounted for rotation upon the base member 12 and at its other end is pivotally connected to a cross link 32. The cross link is in turn pivotally interconnected with a lever 34 which at its rear end is mounted for rotation upon another portion of the base member 12. The pivotal interconnection between the cross link 32 and the lever 34 may be brought about in any suitable manner but I prefer the construction illustrated wherein the lever 34 is provided with an upstanding portion 36 having a vertical slot 38 therein. A stub shaft or screw 40 extends transversely across this slot and the cross link 32 is rotatably mounted upon the stub shaft 40. This construction permits relative shifting of the cross link 32 relative to the stub shaft 40, which shifting will be caused by the fact that as the lever 34 swings about its pivot upon the base member 12, its effective length in the direction of the cross link 32 will change. As will be noted particularly from Fig. 2, the slot 38 has a greater width than that of the cross link 32 so as to permit this relative sliding movement.

The motion of the lever 34 is transmitted to the sliding member 24 by any suitable means, here illustrated as a stud threaded into an upraised portion 44 upon the sliding member 24 and engaging the lever 34 through the slotted opening 46. This slotted opening permits relative sliding movement between the member 24 and the lever 34, which sliding movement is necessary due to the different paths of travel. If desired, the lever 34 may be slightly enlarged at the point of its connection with the sliding member 24 in order to strengthen the construction at this point. If this arrangement is used, it is generally necessary to cut away some metal in the upstanding edge 22 of the member 24 such as the opening 50 in order to make room for the enlarged section 48.

The operation of my thermostatic element adjusting apparatus will be obvious from a study of the above described construction. If movement is imparted to the roller 28 the crank 30 will be actuated to swing about its pivot on the base member 12. Rotation of the crank 30 will be transmitted by the cross link 32 to the lever 34 which will in turn be rotated about its pivotal connection with the base member 12. Rotation of the lever 34 is transferred as a sliding action to the member 24 which will then slide back and forth in the openings of the base member 12 into which its legs 26 are inserted. A rectilinear motion of the base member 24 is therefore provided, which through its upstanding edge 22 will transmit a rectilinear motion to the relatively fixed end of the thermostatic element 16.

Any suitable means can be used for actuating the roller 28. As shown in Fig. 4, motion thereof may be brought about by means of a suitable slotted cam 52 moved by a handle 54 which may be placed on the outside of the face plate (not shown) of the entire valve assembly. It will be obvious that any other means known to those skilled in this art may be used for rotating the crank 30.

A modified construction illustrated in Figs. 5 and 6 has the same object as that described above, namely, giving a rectilinear motion to the adjustable end of the thermostatic element. As is apparent from these figures, which have again been drawn in combination with portions of a thermostatically controlled valve, there is a base portion 112 provided with fluid openings 114. A slidable member 124, preferably U-shaped, may have legs 126 which slide within suitable openings provided in the base member 112. The member 124 also has an upstanding portion 122 to which the thermostatic element (not shown) is to be attached. In this form of my invention the base member 112 is also provided with means for journalling a shaft 111. This shaft may have attached thereto for rotation therewith a pair of pinions 117 which are adapted to cooperate with racks 119 provided on the under side of the legs 126.

Upon rotation of the shaft 111 through suitable means which may include a gear 113, the pinions 117 cooperating with the racks 119, will transpose this rotation of the shaft 111 to a rectilinear motion of the slidable member 124. This in turn will in the same manner move the upstanding edge 122 to which one end of the thermostatic element is connected.

A third modified construction is illustrated in Figs. 7 and 8. This is again illustrated in connection with a thermostatically controlled valve provided with a base member 212 having suitable fluid openings 214. A U-shaped member 224 similar to that of the previous embodiments is provided with legs 226 and an upstanding edge 222 to which the thermostatic element is to be connected.

The base member 212, somewhat similar to the construction illustrated in Figs. 5 and 6, is also provided with means for journalling a shaft 211. Connected to the shaft 211 for rotation therewith are provided a pair of upwardly extending cranks 260. These are pivotally interconnected with upwardly extending portions 262 of the slidable member 224 by means of connecting links 264. Attached to one of the cranks 260 may be provided a roller 228. This roller is suitably actuated by a cam of the type illustrated in Fig. 4, and movement of this roller by such a cam will thereby rotate the cranks 260 and the shaft 211. This pivotal motion of the cranks 260 is transmitted as a rectilinear motion to the slidable member 224 through the pivotally interconnecting links 264.

By means of the foregoing construction the range of control of the thermostatic element is greatly increased. Those constructions in which the adjustable end of the thermostatic element is moved by a pivotally mounted link, such for example, as illustrated in the Becker Patent No. 1,787,304 provide a variation of temperature settings of from 40° to 50°. However, by giving the adjusted end of the thermostatic element a rectilinear motion as is provided by the arrangements according to my invention, this range of set temperatures is increased from 30° to 40° so that the total variation obtainable by means of my invention is from 70° to 90°. Accordingly, my invention is admirably adapted for use in thermostatically controlled mixing valves in which it is desired to set the temperature of the fluid to be mixed over a wide range. In its broader aspect, however, the invention is clearly adaptable to any thermostatically controlled device wherein a wide range of set temperatures is desirable.

It will be apparent to those skilled in this art that various changes may be made in my proposed constructions. Such changes as are encompassed by the language of the following claims, are deemed to come within the scope of this invention.

I claim:

1. In a device adapted to be controlled by a thermostatic element, the combination of a base member for said device, having a pair of openings extending therethrough, a U-shaped member, the legs of which are slidably mounted in said openings in the longitudinal direction of said legs, means for attaching one end of said thermostatic element to the base of said U-shaped member, and means for slidably moving said U-shaped member relative to said base member for adjusting the attached end of said thermostatic element.

2. In a device adapted to be controlled by a thermostatic element, the combination of a base member for said device, having a pair of openings extending therethrough, a U-shaped member, the legs of which are slidably mounted in said openings in the longitudinal direction of said legs, means for attaching one end of said thermostatic element to said U-shaped member, and means for slidably moving said U-shaped member relative to said base member for adjusting the attached end of said thermostatic element, said last means including a lever pivotally connected at one end to said base member, and intermediate its length to said U-shaped member, and means for moving the other end of said lever.

3. In a device adapted to be controlled by a thermostatic element, in combination of a base member for said device, a member slidably mounted relative to said base member, means on said base member for constraining movement of said slidable member to a predetermined path, means for attaching one end of said thermostatic element to said slidable member, and means for moving said slidable member relative to said base member for adjusting the attached end of said thermostatic element, said last means including a lever pivotally connected at one end to said base member, and intermediate its length to said slidable member, a link extending substantially transversely to said lever and pivoted at one end to the other end of said lever, a crank pivotally interconnecting the other end of said link to said base member, and means for rotating said crank about its pivotal connection with said base member.

4. In a device adapted to be controlled by a thermostatic element, the combination of a base member for said device, having a pair of openings extending therethrough, a U-shaped member the legs of which are slidably mounted in said openings, means for attaching one end of said thermostatic element to said U-shaped member, and means for slidably moving said U-shaped member relative to said base member for adjusting the attached end of said thermostatic element, said last means including a lever pivotally connected at one end to said base member, and intermediate its length to said U-shaped member, a link extending substantially transversely to said lever and pivoted at one end to the other end of said lever, a crank pivotally interconnecting the other end of said link to said base member, and means for rotating said crank about its pivotal connection with said base member.

5. In a device adapted to be controlled by a thermostatic element, said device having a pair of straight passages, a U-shaped member, the legs of which are slidably mounted in said passages, means for attaching said thermostatic element to the base of said U-shaped member, a lever pivotally connected at one end to said device for movement in a substantially horizontal plane, means for pivotally and slidably interconnecting said lever and said U-shaped member, whereby oscillation of said lever about its pivotal connection with said device produces sliding movement of said U-shaped member relative to said device, a link extending substantially transversely to said lever and pivotally interconnected thereto at one end, a crank pivotally mounted at one end on said device for movement in a substantially vertical plane, and pivotally connected at its other end to the other end of said link, and means for rotating said crank about its pivotal connection with said device, thereby producing oscillation of said arm through movement of said link.

6. The combination according to claim 5 in which the pivotal connection between said lever and said link includes a raised portion on said lever having a vertical slot whose width is greater than that of said link, and a stub-shaft extending across said slot and rotatably supporting said link.

7. In a device adapted to be controlled by a thermostatic element, the combination of a base member for said device, a member slidably mounted relative to said base member, means on said base member for constraining movement of said slidable member to a predetermined path, means for attaching one end of said thermostatic element to said slidable member, and means for moving said slidable member relative to said base member for adjusting the attached end of said thermostatic element, said last means including a rack on said slidable member, a pinion engaging said rack, and means for rotating said pinion.

8. In a device adapted to be controlled by a thermostatic element, the combination of a base member for said device, having a pair of openings extending therethrough, a U-shaped member, the legs of which are slidably mounted in said openings, means for attaching one end of said thermostatic element to said U-shaped member, and means for slidably moving said U-shaped member relative to said base member for adjusting the attached end of said thermostatic element, said last means including a rack on said U-shaped member, a pinion engaging said rack, and means for rotating said pinion.

9. In a device adapted to be controlled by a thermostatic element, said device having a pair of straight passages, a U-shaped member, the legs of which are slidably mounted in said passages, means for attaching said thermostatic element to the base of said U-shaped member, a pair of racks, one formed on each leg of said U-shaped member, a shaft, means for rotatably mounting said shaft on said device, a pair of pinions on said shaft each engaging one of said racks, and means for rotating said shaft for moving said U-shaped member and said thermostatic element attached thereto relative to said device.

10. In a device adapted to be controlled by a thermostatic element, the combination of a base member for said device, a member slidably mounted relative to said base member, means on said base member for constraining movement of said slidable member to a predetermined path, means for attaching one end of said thermostatic element to said slidable member, and means for moving said slidable member relative to said base member for adjusting the attached end of said thermostatic element, said last means consisting of at least two members, including a crank and a link, said crank being pivoted to said base member, the link to said slidable member, and said crank and link being pivotally connected to one another, and means for rotating one of said members.

11. In a device adapted to be controlled by a thermostatic element, the combination of a base member for said device, having a pair of openings extending therethrough, a U-shaped member, the legs of which are slidably mounted in said openings, means for attaching one end of said thermostatic element to said U-shaped member, and means for slidably moving said U-shaped member relative to said base member for adjusting the attached end of said thermostatic element, said last means consisting of at least two members, including a crank and a link, said crank being pivoted to said base member, and the link to said U-shaped member, and said crank and link being pivotally connected to one another, and means for rotating one of said members.

12. In a device adapted to be controlled by a thermostatic element, said device having a pair of straight passages, a U-shaped member, the legs of which are slidably mounted in said passages, means for attaching said thermostatic element to the base of said U-shaped member, a shaft journalled on said device, a pair of cranks mounted for rotation with said shaft, a pair of links, one pivotally connecting each crank with said U-shaped member, and means for rotating one of said cranks.

13. In a valve of the type having a base, a housing mounted on said base, containing a fluid-conducting conduit, a vane rotatably supported on said housing for controlling the flow of fluid from said conduit, and a thermostatic element connected at one end to said vane, the combination of a U-shaped member, the legs of which are slidably mounted in said base in the longitudinal direction of said legs, means for attaching the other end of said thermostatic element to said U-shaped member, and means for slidably moving said U-shaped member relative to said base for adjusting the position of said thermostatic element.

14. The combination according to claim 13, in which the legs of said U-shaped member extend through said base transversely to the axis of rotation of said vane.

FRANK SLEZAK.